Figure 1:
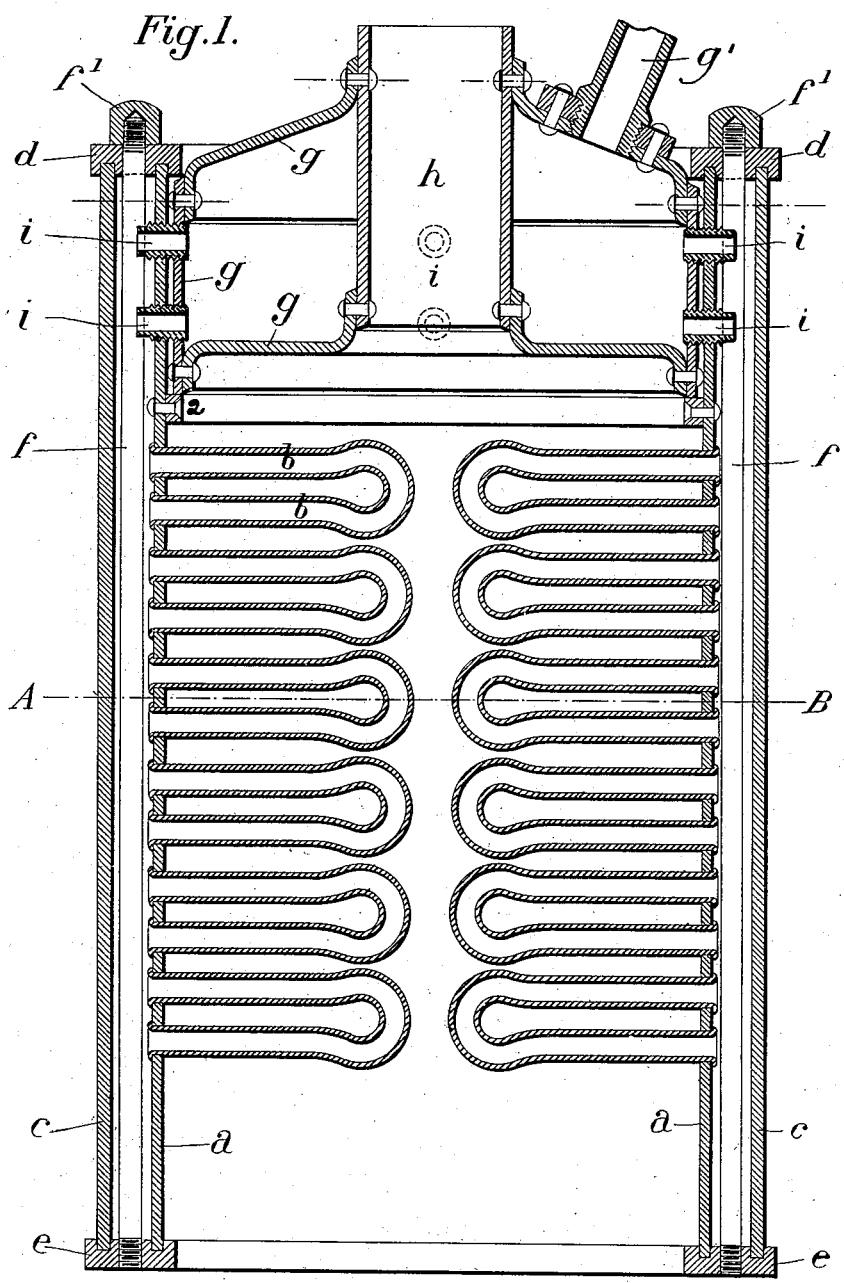

No. 735,597. PATENTED AUG. 4, 1903.
F. W. SCHIRMER.
STEAM GENERATOR.
APPLICATION FILED APR. 4, 1903.
NO MODEL. 2 SHEETS—SHEET 1.

Witnesses
Chas H Smith
J. Staib

Inventor
Friedrich W. Schirmer
per Harold Serrell
atty.

THE NORRIS PETERS CO., PHOTO-LITHO., WASHINGTON, D. C.

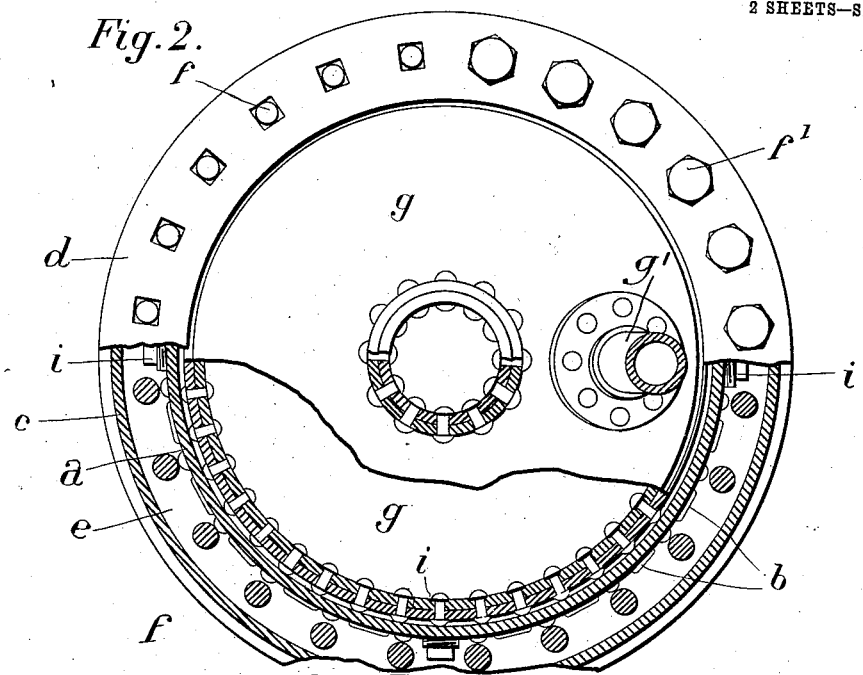
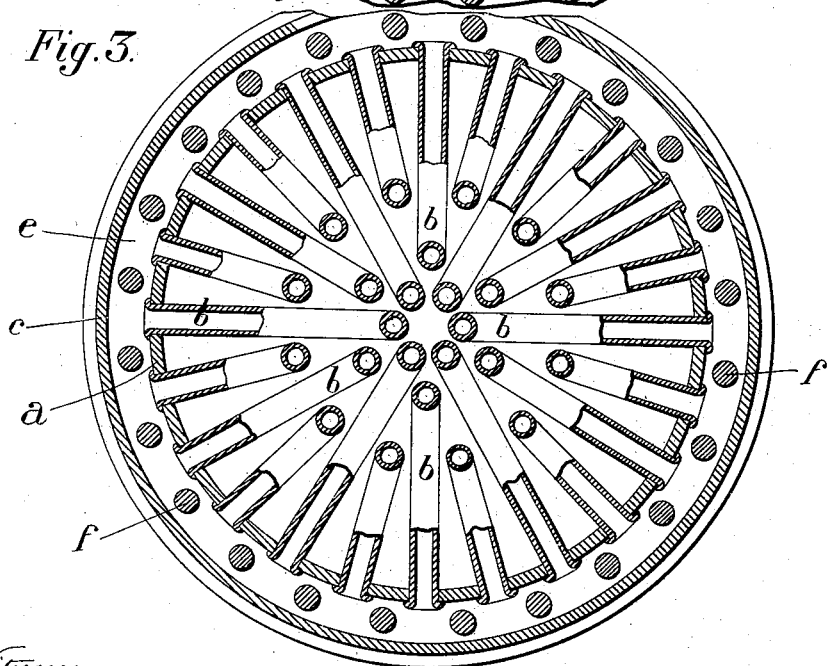

No. 735,597. Patented August 4, 1903.

UNITED STATES PATENT OFFICE.

FRIEDERICH WILHELM SCHIRMER, OF AUBONNE, SWITZERLAND, ASSIGNOR TO THE FIRMS OF PERROT DUVAL & CO., OF GENEVA, SWITZERLAND, AND COMPTOIR INDUSTRIEL DE BERNE, A. SCHOPFER, OF BERNE, SWITZERLAND.

STEAM-GENERATOR.

SPECIFICATION forming part of Letters Patent No. 735,597, dated August 4, 1903.

Application filed April 4, 1903. Serial No. 151,066. (No model.)

*To all whom it may concern:*

Be it known that I, FRIEDERICH WILHELM SCHIRMER, of Aubonne, Switzerland, have invented certain new and useful Improvements in Steam-Generators, of which the following is a specification.

My invention relates to steam-generators, and particularly to that class of such devices in which steam is generated very rapidly, and which are therefore especially adapted for use in connection with the motors of automobiles.

In carrying out my invention I employ outer and inner concentric cylindrical walls, rings having concentric circular recesses into which the ends of said walls are fitted, bolts for holding these parts together, water-tubes secured in the inner cylindrical wall, a steam-dome in the upper part of the generator, a smoke-stack passing centrally through the same, a steam-pipe leading from the steam-dome, and connections from the interior of the steam-dome to the upper portion of the space between the said concentric cylindrical walls, all of which will be hereinafter more particularly described.

In the drawings, Figure 1 is a central vertical section of my improved steam-generator. Fig. 2 is a plan and partial section of the same; and Fig. 3 is a section on line A B, Fig. 1.

$c$ represents an outer cylindrical wall, and $a$ an inner cylindrical wall concentric therewith.

$d$ and $e$ are rings whose respective lower and upper surfaces are provided with concentric circular recesses into which the upper and lower ends of the said walls $c$ and $a$ are fitted. I employ bolts $f$, which are passed through the ring $d$, between the walls $c$ and $a$, and into the ring $e$ and are provided with nuts $f$, by which these parts are drawn together and held in place.

$b$ represents substantially U-shaped horizontally-placed water-tubes whose ends are secured in the inner wall $a$ by reaming, calking, or otherwise, so as to provide a water-tight joint. These water-tubes are arranged radially inward to the axis of the inner cylindrical wall $a$ and preferably vary in length, as shown in Fig. 3. In order to obtain a greater heating-surface, I prefer to make the bend in the tubes somewhat greater than a semicircle.

Interiorly of the inner wall $a$ and above the uppermost water-tubes I employ an internal annulus-flange 2. A steam-dome $g$ is composed of three parts and the sides of which fit within the inner cylindrical wall $a$, is supported by the internal annulus-flange 2, and is provided centrally with a chimney or smoke-stack $h$, connected at its respective ends to parts of the steam-dome.

$i$ represents pipe-sections connecting the interior of the steam-dome $g$ to the upper portion of the space between the inner and outer cylindrical walls $a$ and $c$, and $g'$ represents a steam-pipe for conveying the steam from the dome $g$.

Any suitable heating device, such as a petroleum-burner, may be employed beneath the water-tubes, and if the water-level be maintained to keep the upper tubes filled a circulation will be established which will tend to prevent the formation of scale in the tubes.

It will be readily understood that by unscrewing the nuts $f'$ the outer wall $c$ may be removed for the purposes of cleaning and repairs.

I claim as my invention—

1. A steam-generator comprising a cylindrical outer wall, a cylindrical inner wall concentric with the aforesaid wall, rings having concentric circular recesses into which the ends of the said walls are fitted, bolts for holding these parts together, substantially U-shaped water-tubes horizontally placed and secured in the inner wall, a steam-dome in the upper part of the generator, a smoke-stack passing centrally through the same, a steam-pipe leading from the steam-dome, and connections from the interior of the steam-dome to the upper portion of the space between the said concentric cylindrical walls.

2. A steam-generator comprising a cylindrical outer wall, a cylindrical inner wall concentric with the aforesaid wall, rings having concentric circular recesses into which the ends of the said walls are fitted, bolts for holding these parts together, substantially U-shaped water-tubes horizontally placed and secured in the inner wall, a steam-dome in the upper part of the generator within the cylindrical part $a$ and composed of three parts $g$, a central smoke-stack $h$ passing through and connected to the steam-dome, pipe-sections 5 connecting the interior of the steam-dome with the space between the cylindrical walls and an annulus-flange 2 acting largely as a support for the steam-dome.

In testimony that I claim the foregoing as my invention I have signed my name in presence of two subscribing witnesses.

FRIEDERICH WILHELM SCHIRMER.

Witnesses:
Y. IMER,
T. H. MUNICH.